United States Patent

[11] 3,581,172

| | | | |
|---|---|---|---|
| [72] | Inventors | Takashi Tsuboi;<br>Hiroshi Narita, both of Katsuta-shi, Japan | |
| [21] | Appl. No. | 812,168 | |
| [22] | Filed | Apr. 1, 1969 | |
| [45] | Patented | May 25, 1971 | |
| [73] | Assignee | Hitachi, Ltd.<br>Tokyo, Japan | |
| [32] | Priority | Apr. 1, 1968 | |
| [33] | | Japan | |
| [31] | | 43/20981, 43/25209 and 43/25214 | |

[54] CONTROL SYSTEM OF ELECTRIC MOTOR
13 Claims, 37 Drawing Figs.

[52] U.S. Cl. ................................................ 318/259,
318/274, 318/422
[51] Int. Cl. .................................................... H02p 1/20
[50] Field of Search ........................................ 318/259,
274, 422

[56]   References Cited
UNITED STATES PATENTS
3,299,347   1/1967   Torii............................   323/97

Primary Examiner—Oris L. Rader
Assistant Examiner—K. L. Crosson
Attorney—Craig, Antonelli, Stewart and Hill ABSTRACT: A control system for electric motors effecting variation of the electric motor current in a step-by-step operation in successive stages, second impedance control means for controlling the variation of said current by said first means in a linear fashion by providing an impedance varying from a minimum value to a maximum value during each stage of operation and control means for effecting a transition of first means from one stage to the next in response to detection of said motor current reaching a predetermined value and simultaneously changing the impedance of said second means to said maximum value.

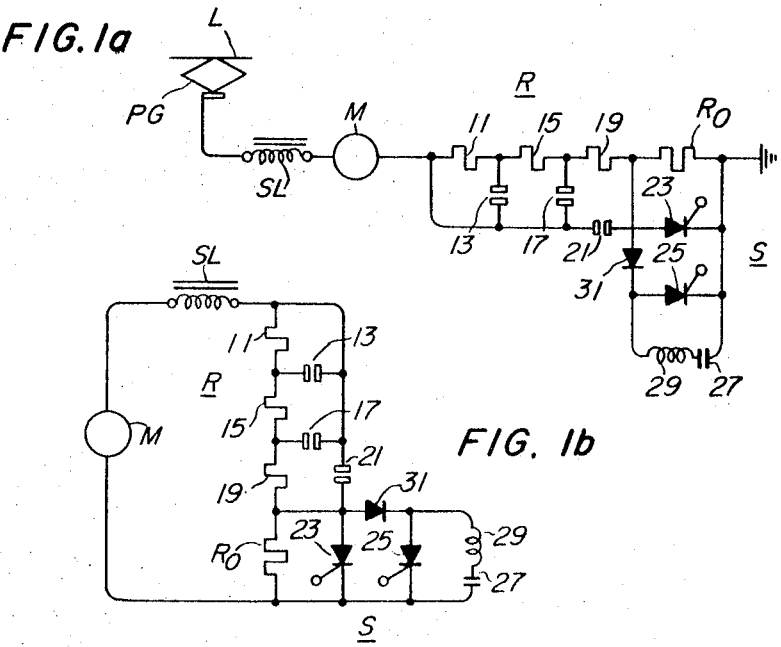
FIG. 1a
FIG. 1b
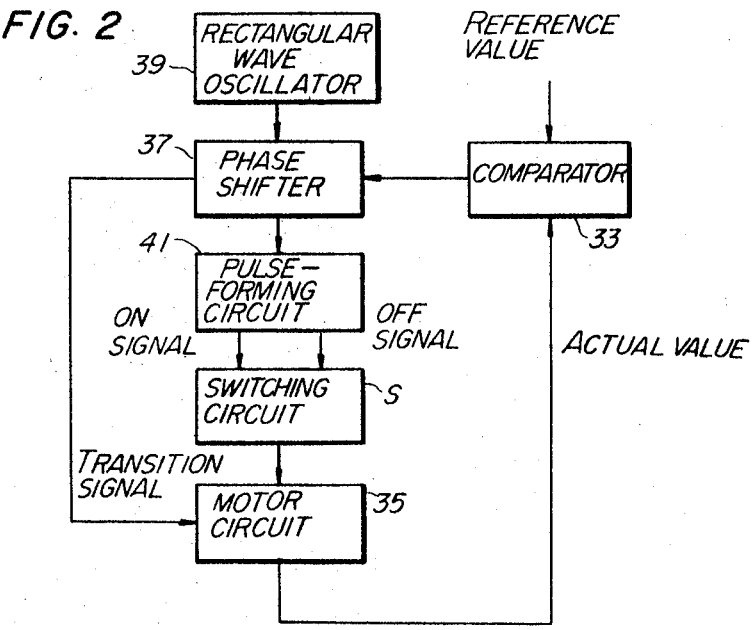
FIG. 2

FIG. 5
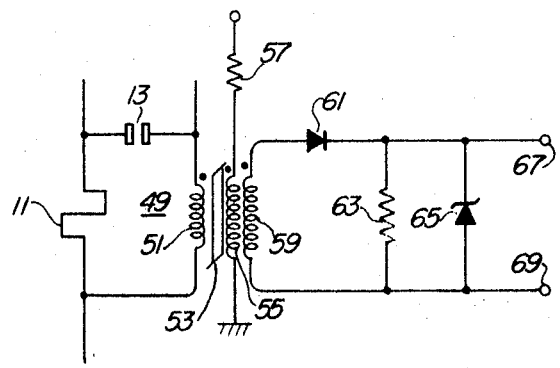
FIG. 6a
MOTOR CURRENT
FIG. 6b
RESISTOR CURRENT
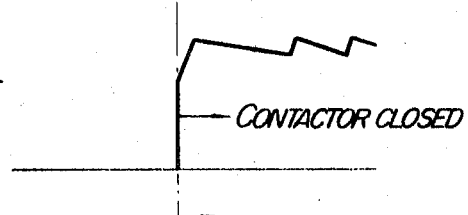
FIG. 6c
CONTACTOR CURRENT
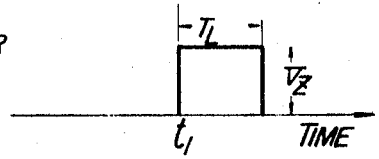
FIG. 6d
SATURABLE REACTOR OUTPUT

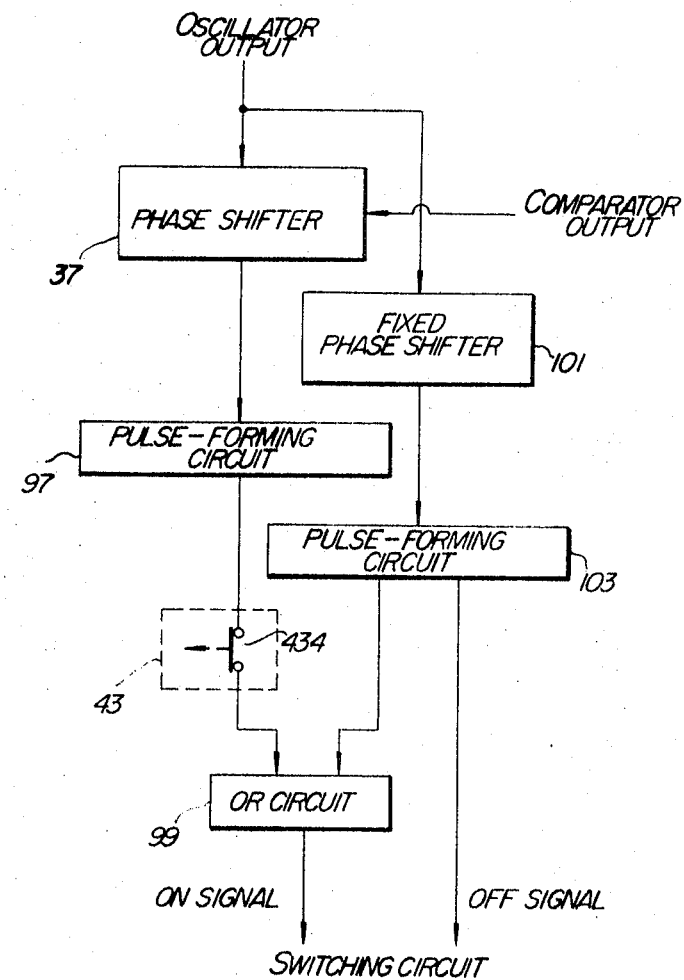

FIG. 10a OSCILATOR OUTPUT
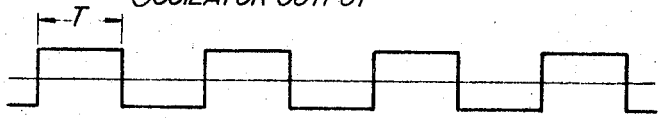
FIG. 10b PHASE SHIFTER OUTPUT
FIG. 10c ON SIGNAL
ON SIGNAL FROM FIXED PHASE SHIFTER
FIG. 10d OFF SIGNAL (FROM FIXED PHASE SHIFTER)
TIME RELAY OPERATING DURATION
FIG. 10e MOTOR CURRENT
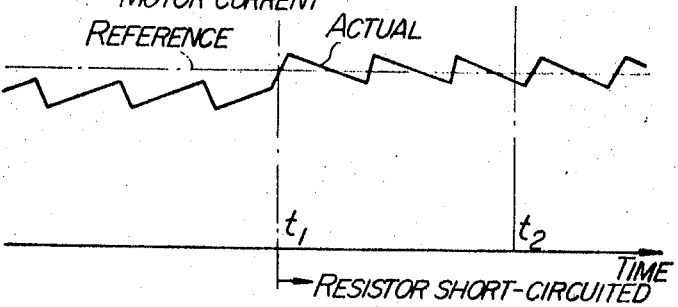
REFERENCE   ACTUAL
$t_1$   $t_2$
TIME
RESISTOR SHORT-CIRCUITED

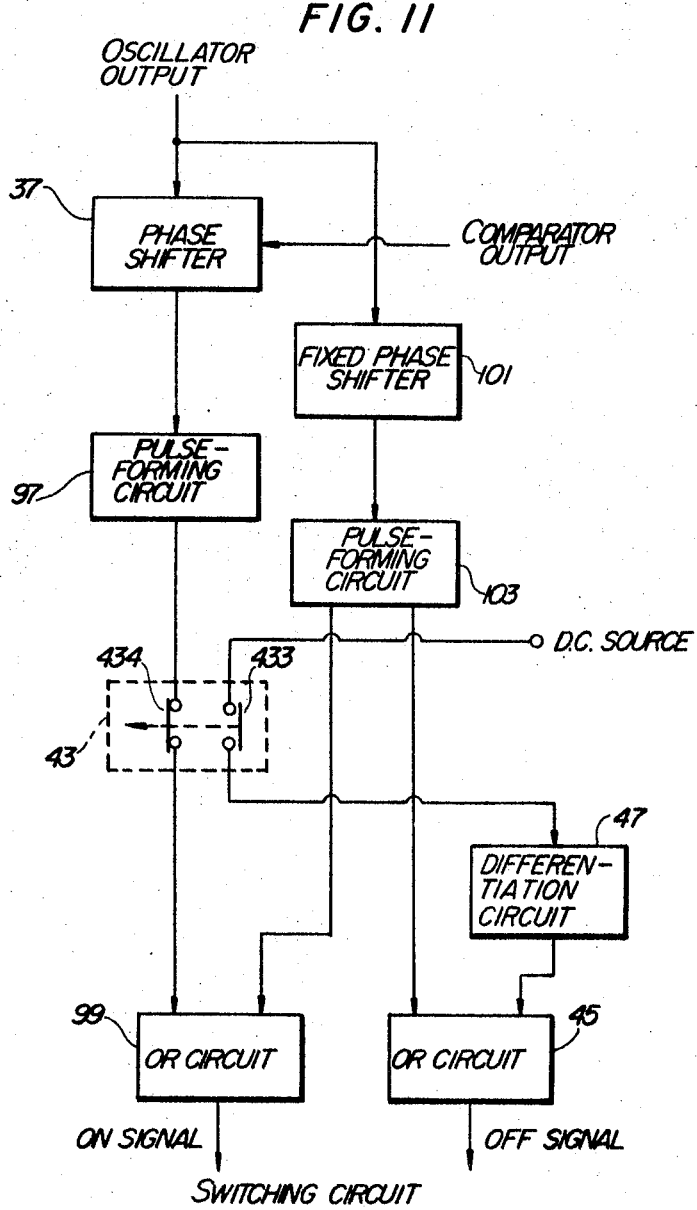

FIG. 12a OSCILLATOR OUTPUT
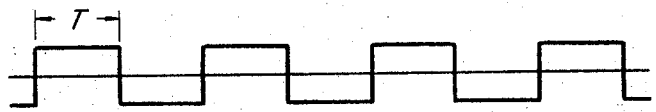
FIG. 12b PHASE SHIFTER OUTPUT
FIG. 12c ON SIGNAL
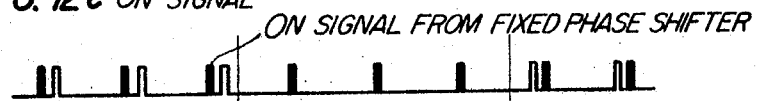
FIG. 12d OFF SIGNAL (FROM FIXED PHASE SHIFTER)
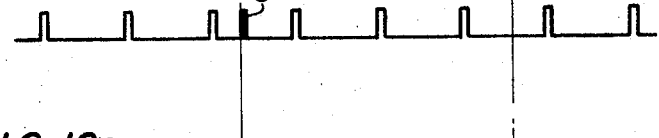
FIG. 12e MOTOR CURRENT
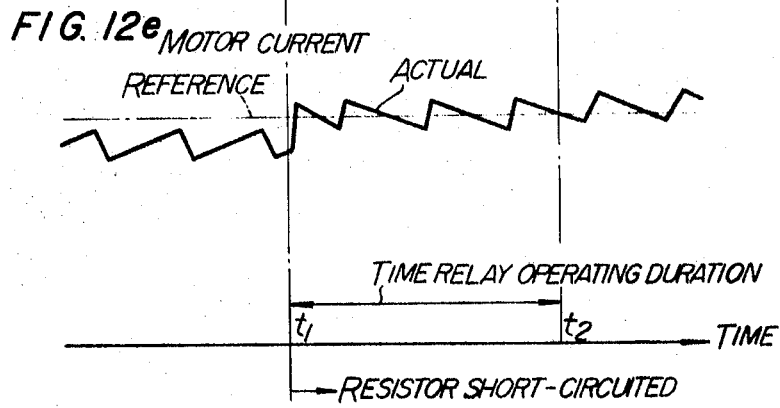

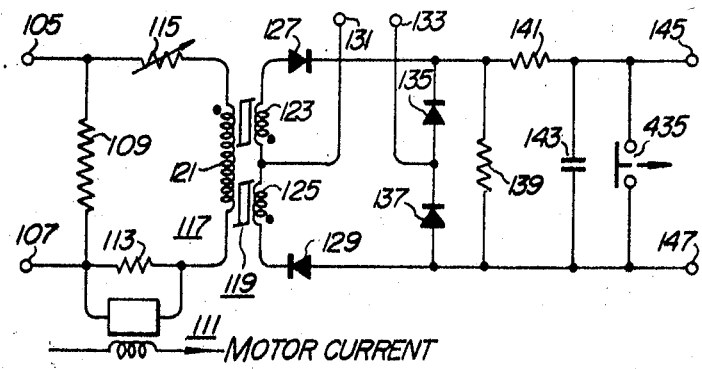
FIG. 13
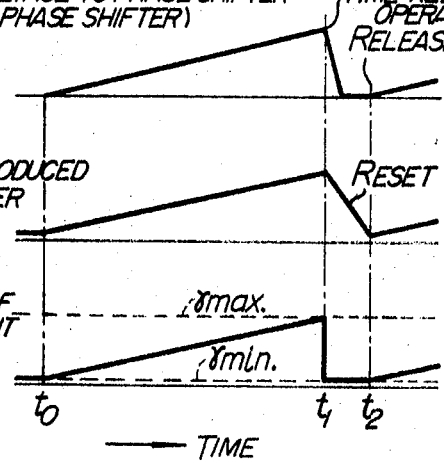
FIG. 14a
CONTROL VOLTAGE TO PHASE SHIFTER
(INPUT TO PHASE SHIFTER)
FIG. 14b
PHASE SHIFT PRODUCED
BY PHASE SHIFTER
FIG. 14c
DUTY CYCLE γ OF
SWITCHING CIRCUIT FIG. 15a  BRAKE PATTERN (REFERENCE)
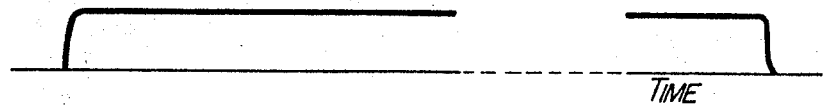
FIG. 15b  MOTOR CURRENT
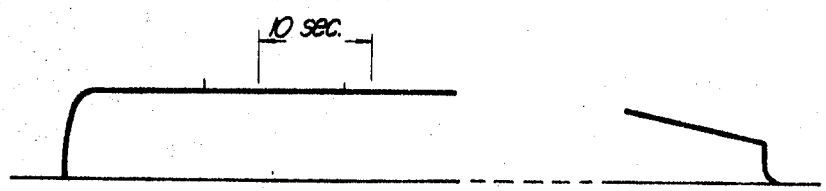
FIG. 15c  PHASE SHIFTER INPUT
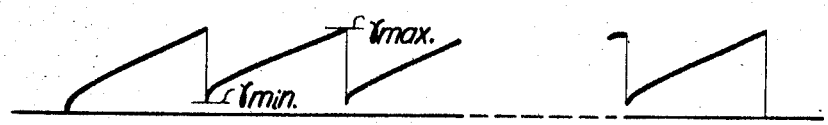
FIG. 15d  SATURABLE REACTOR OUTPUT
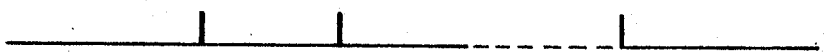
FIG. 15e  VELOCITY
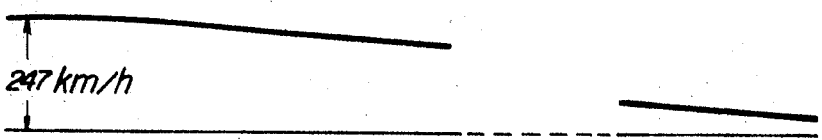
INVENTORS
TAKASHI TSUBOI
AND
NARITA HIROSHI
BY Craig, Antonelli, Stewart & Hill
ATTORNEYS

CONTROL SYSTEM OF ELECTRIC MOTOR

The present invention relates to a system for continuously controlling the applied voltage or current to electric motors.

It is necessary to control the continuously applied voltage or current to an electric motor employed to drive a conveyance such as a vehicle, an elevator or the like which essentially requires a comfortable ride.

For this purpose, a means is provided to control intermittently applied voltage or current to an electric motor by means of a switching circuit. (cf. I.E.E.E. "Transactions on Communication and Electronics," July 1964, Pages 390 to 399, or Elektrische Bahnen, Heft 10, 35 Jahrgang, 1964, Seiten 194 bias 301).

These means will first be described with respect to a power running condition. The switching circuit is connected in series with an electric motor. If the switching circuit is made and broken, the electric motor is intermittently connected with a power source and is supplied with electric power in the connected duration. Hence, suppose now that T is a make-and-break period of the switching circuit and Ton is a closed duration in the period, then the average voltage Em supplied to the motor results as follows, $$Em = \frac{Ton}{T} E$$

where E is the power source voltage, and, as is well known, the fraction Ton/T is described as the duty cycle and will be represented by $\gamma$ in the description hereafter.

As is apparent from the above expression, if $\gamma$ in the switching circuit is controlled, the applied voltage to the motor is controlled thereby controlling the conveyance velocity. Accordingly, a continuous control of $\gamma$ makes it possible to control the velocity continuously.

Next, the means will be described with respect to a braking condition. Braking comprises dynamic braking and regenerative braking. A description will, however, be given of dynamic braking which is closely connected with the present invention.

Dynamic braking is effected through the consumption of electric power generated by an electric motor and applied to a proper load, and a resistor is generally employed for said load. Then, when a switching circuit is connected in parallel with this resistor, the equivalent resistance value of this resistor may be controlled by make-and-brake control of the switching circuit. Namely, supposing that R is the resistance value of this resistor $R_{eq}$ is its equivalent resistance value, the following expression holds.

$$R_{eq} = R(1 - \gamma)$$

Braking force may be controlled through controlling the motor current by means of $R_{eq}$, so a continuous control of $\gamma$ can effect a continuous control of the braking force.

Here, in this structure, the switching circuit is, in any case, impressed with the full power source voltage or the full voltage generated by the motor, thereby requiring a high voltage resistivity for the switching circuit.

For this reason, in any of the above cases, a system is usually provided wherein the motor is equipped with a plurality of resistor sections, a specified one of the resistor sections is connected with a switching circuit in parallel therewith, and the respective other resistor sections may be short-circuited by means of contactors.

Accordingly, the impressed voltage on the switching circuit is extremely reduced in any of the above cases, because it is reduced to a fraction of the full voltage divided by the number of the resistor sections.

The above structure, however, involves a remaining essential problem when continuous control is required.

That is to say, the control is effected in a structure such as mentioned above wherein, through the control of $\gamma$ of the switching circuit, the equivalent resistance value of the parallel connected resistor is controlled until the upper limit of the control range is reached, then $\gamma$ of the switching circuit is restored to its lower limit value simultaneously with short-circuiting of another resistor section.

Thus, the continuous control of the total resistance value is effected through the combined controls of short-circuiting in a plurality of resistor sections and variation of the $\gamma$ value in the switching circuit.

If short-circuiting in each resistor section is not effected in precise time relation, overshooting will be caused in the motor current mainly coming from a delay in the current control system.

The above description will be made clearer by the explanation of an example of the subjects to which the present invention is to be applied, preceding the explanation of an embodiment of the present invention.

One object of the present invention is to remove overshoot in an electric motor current generated by a control delay in the motor current control system with respect to such a control system as stated above.

Another object of the present invention is to solve problems in controlling due to general characteristics involved in the switching circuit.

Another object of the present invention is further to remove overshoot in an electric motor current generated during the first one or two of the operation periods of the switching circuit depending on the time relationship between transition starting and the operation period of the switching circuit.

A further object of the present invention is to provide a disturbance-proof control system even in transition process.

The other further objects of the present invention will be recognized in the accompanying drawings for respective embodiments and the descriptions given thereof.

The present invention is characterized in providing a first means for enabling control of the electric motor current in a stepwise manner, a second means for enabling control of said motor current continuously in each control stage in said first means, a third means for controlling said first and second means correlated with each other, and a fourth auxiliary control means for detecting the start of the transition in the above respective control stages and generating a signal which functions effectively only through the transition process. Further, an additional characteristic of the present invention lies in the respective embodiments shown in the accompanying drawings wherein said second means comprises a switching circuit and an impedance section connected in parallel therewith.

Referring now to the accompanying drawings wherein:

FIGS. 1a and 1b are respective schematic diagrams of main circuit connections illustrated with examples of electric rolling stocks employing the electric motor circuits to which the present invention is to be applied;

FIG. 2 is a block diagram showing a typical current control system for the electric motor circuits shown in FIGS. 1a and 1b;

FIG. 5, FIGS. 6a to 6d, FIG. 7 and FIG. 8 illustrate transition detecting means applicable to every embodiment system according to the present invention;

FIG. 9 is a block diagram showing a principal portion of another embodiment system according to the present invention;

FIGS. 10a to 10e are performance charts illustrating performances of the above embodiment system;

FIG. 11 is a block diagram showing a principal portion of a further embodiment system according to the present invention;

FIGS. 12a to 12e are performance charts illustrating performances of the above embodiment system;

FIG. 13 shows an improved embodiment according to the present invention;

FIGS. 14a to 14c are performance charts illustrating performances of the above embodiment system; and FIGS. 15a to 15e show a performance example obtained by experiment according to the present invention.

Figure 3:
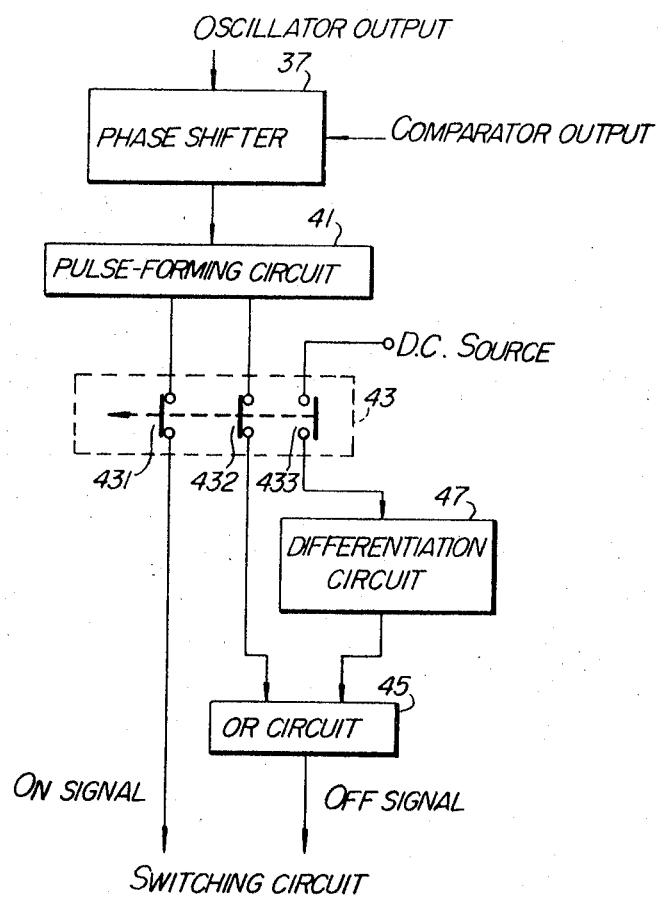
FIG. 3 is a block diagram showing a principal portion of the embodiment system according to the present invention.

Now, before entering into the explanation of an embodiment according to the present invention, a detailed description will be given of the structure of an electric motor circuit to which the present invention is to be applied, taking an electric rolling stock as an example.

FIGS. 1a and 1b are schematic diagrams showing the respective main circuits in electric rolling stocks, wherein FIGS. 1a shows a structure of a main circuit for power running and FIG. 1b shows that for dynamic braking.

In FIG. 1a, L designated a contact wire fed with required DC power from a source (not shown). A pantograph PG supplied electric power to the electric rolling stock by maintaining sliding power with the contact wire L. M designates an electric motor for driving the electric rolling stock and the motor current is controlled through a means described hereunder.

The above control means has the following structure. A main resistor R comprises a plurality of resistor sections 11, 15 and 19, and these resistor sections are provided with the respective contactors 13, 17 and 21 which short circuit the respective resistor sections separately from each other. The number of the resistor sections may be more than that shown in FIGS. 1a and 1b and the resistance value of the resistor sections are chosen to be nearly equal to each other.

The main resistor R is provided with another additional resistor $R_0$. The resistor $R_0$ is provided for continuous resistance variation to compensate for the successive discontinuity between the resistance values varied stepwise by the contactors 13, 17 and 21.

In order to control continuously the equivalent resistance value of the resistor $R_0$, a switching circuit S is provided in parallel connection with the resistor $R_0$.

The switching circuit S comprises a thyristor 23 which makes a main current, namely the motor current in this case, flow through itself and a thyristor 25 which causes a commutation in the thyristor 23. Energy required for the communication is supplied by a series resonance circuit composed of a capacitor 27 and a reactor 29. Further with respect to the energy stored in the series resonance circuit, the capacitor 27 is charged by an electric current flowing through a diode 31 in the nonconductive intervals of the thyristors 23 and 25.

When a forward voltage is applied between an anode and a cathode of the thyristor 23, the capacitor 27 is charged through the diode 31 having plus polarity on its side connected with the reactor 29. After charging of the capacitor 27 is completed, if a first signal is supplied to a gate electrode of the thyristor 23, the thyristor 23 conducts. In this case, however, the charge in the capacitor 27 is not discharged being prevented by the diode 31.

Then, if a signal is supplied to a gate electrode of the thyristor 25, the thyristor 25 conducts, therefore, the charge in the capacitor 27 is discharged thereby causing a series resonance oscillation together with the reactor 29. Accordingly, the charging polarity of the capacitor 27 is reversed.

Thus, after a half cycle of the series resonance oscillation, both cathodes of the thyristors 23 and 25 are raised to a high positive potential, so both of the thyristors extinguish.

In this way, the switching circuit S becomes conductive or nonconductive according to the two kinds of signals. Then, if the two kinds of signals are periodically supplied, the above two states conductive and nonconductive will be repeated alternately and also periodically.

The ratio of the conductive duration to the repetition period of the above two states namely the operation period of the switching circuit S is the duty cycle mentioned already.

The duty cycle may be controlled at will be varying the time interval between the two kinds of signals.

The resistance value across the resistor $R_0$ connected in parallel with the switching circuit S is equivalently varied by controlling the duty cycle as is seen from the following expression.

$$R_0(1-\gamma) \qquad (1)$$

where $R_0$ in the above expression is the resistance value of the resistor $R_0$.

It will be apparent from the above description that the value of the resistor $R_0$ in FIGS. 1a and 1b can be continuously controlled by controlling the duty cycle of the switching circuit S.

Now, referring to FIG. 1a, a description will be given of power running performance of the motor M.

At first, all the contactors 13, 17 and 21 are opened. At this time, the resistance value of all of the resistors connected in series with the motor M is $$R_1+_2+R_3+R_0 \qquad (2)$$

where $R_1$, $R_2$ and $R_3$ designate the respective resistance values of the resistor sections 11, 15 and 19.

When the duty cycle of the switching circuit is being controlled, the total resistance value of the resistors connected in series with the motor M is given by $$R_1+_2+R_3+R_0(1-\gamma) \qquad (3)$$

The varying value of $\gamma$ is generally within the range of $0<\gamma<1$, however, the $\gamma$ value is restricted within a range from a lower limit $\gamma_{min.}$ up to an upper limit $\gamma_{max.}$, for instance 0.1-—0.9, due to various conditions as will be stated later.

Therefore, the resistance value $R_0(1-\gamma)$ becomes smaller as the duty cycle $\gamma$ approaches $\gamma_{max.}$ after its control is started from $\gamma_{min.}$.

When the duty cycle reached the upper limit $\gamma_{max.}$, the resistance value given by the expression (3) becomes minimum, hence the impressed voltage to the motor M can not be raised any more if the condition is left as it is. This state is called the first notch end state.

Then, a detector detects that the duty cycle has just reached $\gamma_{max.}$ and sends out an instruction to close the contactor 13. When the resistor section 11 is short-circuited according to this instruction, the total resistance value of the resistors connected in series with the motor is given by $$R_2+_3+R_0(1-\gamma_{max.}) \qquad (4)$$

Since the value of $R_0(1-\gamma_{max.})$ is very small, the resistance value given by the expression (4) is substantially equal to that of $R_2+R_3$.

Hence, a sudden variation in the resistance value is caused by short-circuiting the resistor section 11, thereby causing also an undesirable sudden variation in the motor current.

Therefore, if the duty cycle is restored to $\gamma_{min.}$ almost at the same time when the resistor section 11 is short-circuited, the expression for the resistance value is now given by $$R_2+_3+R_0(1-\gamma) \qquad (5)$$

Accordingly, if the resistance variation $R_0(\gamma_{max.}-\gamma_{min.})$ caused by the restoration of the duty cycle from $\gamma_{max.}$ to $\gamma_{min.}$ is made nearly equal to the resistance value $R_1$ of the resistor section 11, no sudden variation in the resistance value as described above will be brought about.

The series of processes which comprise short-circuiting the resistor section 11 and restoring the duty cycle back to $\gamma_{min.}$ after the arrival of the duty cycle at $\gamma_{max.}$ is called a transition.

The duty cycle control is again started from $\gamma_{min.}$ and the control enters into the second notch stage. When $\gamma_{max.}$ is again reached in the second notch stage, the same transition as mentioned above is effected and the control is shifted to the third notch stage.

Thus, by means of the correlated closing of the contractors 13, 17 and 21 and variation of the duty cycle of the switching circuit S, a continuous resistance control is effected throughout all the notch stages.

If the contactor 21 in FIG. 1a is closed and then the duty cycle reaches $\gamma_{max.}$ by the control thereby which is to be started from $\gamma_{min.}$, the whole control throughout all the notch stages is completed thereby impressing full power source voltage on the motor M.

In order to obtain a further velocity, a means such as the usual field-weakening control should be resorted to.

As described above, the switching circuit functions to control an equivalent resistance value by intermittently diverting the current flowing through the resistor $R_0$, therefore, pulsation takes place to some extent in the motor current. In this instance, too much pulsation spoils commutation in the motor M. A smoothing reactor SL is to be inserted in order to absorb this pulsation thereby improving the commutation condition for the motor M.

A similar control is also effected in a main circuit in case of dynamic braking. In order to brake the motor M maintaining a constant deceleration, the motor current has to be controlled at a constant value independent of the speed of the motor M.

In this connection, the motor current has to be controlled at a required value by increasing the resistance value of the main resistor R when the motor speed is high and the generated voltage in the motor M is also high, while the above case is reversed by reducing the resistance value when the generated voltage falls down as the motor speed slows down.

Such control of the resistance value is the same as has been described with reference to FIG. 1a, so a detailed description thereof will be omitted.

FIG. 2 shows a block diagram of a current control system for such a motor circuit.

Referring on FIG. 2, a comparator 33 generates a voltage Vc corresponding to the deviation E between the actual value and the motor circuit 35 from a reference value. The comparator 33 is composed of well-known elements, however, it is provided with a proper gain and a proper time constant to obtain a loop gain and a response which are suitable to the control system.

A phase shifter 37 is composed of, for example, a magnetic amplifier or the like. In taking a magnetic amplifier as an example, the magnetic amplifier shifts the phase of rectangular waves coming from a rectangular wave oscillator 39, which is provided as an AC power source for this magnetic amplifier and is composed of, for example, a multivibrator, by receiving the output voltage Vc at a control winding thereof and employing it as a control input signal, and thus the phase shifter 37 decides the duty cycle of the switching circuit S.

Further, the phase shifter 37 comprises a means which detects the arrival of the phase shift output at a predetermined upper limit and sends out a transition signal instructing the motor circuit 35 to enter into the transition.

A pulse-forming circuit 41 comprises a differentiation circuit which differentiate the rising portion of the output voltage waveform from the phase shifter 37 in order to obtain an ON signal to the switching circuit S, while differentiating the falling portion to obtain an OFF signal thereto.

Waveforms and the like appearing in the above operation will be further made clear in the following description of an embodiment according to the present invention.

Generally, in a control system such as described above, a loop gain is chosen within the range 10 to 20 and response is chosen within the range 0.5 to 1 second in order to hold the offset of the average value of the motor circuit from a reference value to the extent of 10 percent of the latter.

Now, in a current control system such as stated above, the varying operation of the duty cycle $\gamma_{max}$ to $\gamma_{min}$ is much delayed in the transition from one notch stage to another notch stage, hence large overshooting takes place in the motor current during the transition.

The fact is that, when the contactor 13 is closed short-circuiting the resistor section 11, the motor current is increased and causes a negative deviation $\epsilon$ when it exceeds the reference value. The duty cycle is restored to $\gamma_{min}$ from $\gamma_{max}$ due to this negative deviation $\epsilon$, however, at the same time it is required for the duty cycle to be restored to $\gamma_{min}$ from the actual generation of the negative deviation $\epsilon$ because of the existence of the time delay of 0.5 to 1 second in the control system as described above. During the delay time, the resistor section 11 is short-circuited, besides, the equivalent resistance value is made small, therefore, the state of the resistance value shown by the above expression (4) results.

Accordingly, the total resistance value comprised in series with the motor M at that time is considerably smaller than the normal resistance value to be had through the resistance insertion in the notch stage succeeding the transition, and this causes overshooting in the motor current.

The above trouble may be eliminated if the response of the control system is made fast, however, the control system becomes more sensitive to external noise as the response is improved. Besides, when the motor control is to be effected under very noisy conditions, the improvement of the response can not be easily expected if the control stability is taken into consideration.

The present invention provides other means for compensating for the above time delay, and FIG. 3 shows a principal portion of one embodiment thereof. With respect to other portions, the structure shown in FIG. 3 is the same as that shown in FIG. 2. A description will be given of its structure referring to FIG. 3 and its performance referring to FIG. 4.

The phase shifter 37 shifts the phase of the output of the oscillator 39 shown in FIG. 4a by means of the output of the comparator 33, the waveforms including the shifted phase being shown in FIG. 4b.

The time T, shown in FIG. 4a, is half period of oscillation in the oscillator 39 and simultaneously decides the operation period of the switching circuit S. The structure of each of the elements is the same as shown in FIG. 2.

The output of the phase shifter 37 is converted into ON and OFF signals to be sent to the switching circuit S, through the operation of the pulse-forming circuit 41. (cf. FIGS. 4c and 4d)

The ON signal is supplied to the switching circuit S through a contact 431 in a time relay 43, and the OFF signal is also supplied to the switching circuit S through a contact 432 and an OR circuit 45.

On the other hand, the OR circuit 45 is supplied with another signal obtained through a contact 433 and a differentiation circuit 47 originating from a DC power source.

A similar control as shown in FIG. 2 is effected in the respective notch stages. However, because the time relay 43 operates in correlation with the contactors 13, 17 and 21, the controlling mode during the transition is different from that in the case of FIG. 2.

That is to say, when the duty cycle reaches $\gamma_{max}$ in the first notch stage, for example, an instruction is sent out to close the contactor 13. (The time $t_1$ shown in FIG. 4) The resistor section 11 is short-circuited when the contactor 13 is closed. Consequently, the motor current is rapidly increased thereby exceeding the reference value.

However, the time relay 43 operates at that very instant to open the contacts 431 and 432 and simultaneously to close the contact 433, thereby causing the differentiation circuit 47 to be supplied with DC voltage from DC power source.

Because the signal obtained by differentiating this voltage is supplied as an OFF signal to the switching circuit S through the OR circuit 45, the switching circuit S turns nonconductive thereby inserting the resistor $R_0$ in series with the motor M.

Then, if the resistance values are chosen so as to make the relation $R_1 > \gamma_{max} \cdot R_0$ hold, the total resistance value just before short-circuiting the resistor section 11

$$R_1 + _2 + R_3 + R_0(1 - \gamma_{max}) \qquad (6)$$

becomes larger than the total resistance value after short-circuiting the resistor section 11.

$$R_2 + _3 + R_0 \qquad (7)$$

Further, by means of the proper selection of these resistance values, the motor current increase can be withheld at a value slightly above the reference value. (cf. FIG. 4e)

Thus, it is possible to prevent the generation of large overshoot in the motor current and make the deviation $\epsilon$ of the actual value from the reference value become negative.

By means of this negative deviation $\epsilon$, the phase shift in the phase shifter 37 is reset at a value corresponding to $\gamma_{min}$ after the response time of the current control system (0.5 to 1 second in this example).

After that, if the time relay 43 is released to close the contacts 431 and 432, the switching circuit S recovers its normal operation where it is controlled by normal ON and OFF signals.

However, at that time, there exists a time relationship between the ON and OFF signals to maintain the duty cycle of the switching circuit S at the value of $\gamma_{min}$.

Hence, it is necessary to predetermine the operating duration of the time relay 43 at a value somewhat larger than the response time of the current control system.

The above description of the time relay 43 indicates correlated operation thereof with the contactors 13, 17 and 21, etc., however, these can be replaced by contactless means such as described hereunder, thereby bringing about more effective results.

FIG. 5 shows an example of such contactless means.

For example, as is seen in FIG. 5, a saturable reactor 49 is provided in a bypass circuit into which the current flowing through the resistor section 11 is to be commutated when the contactor 13 is closed and the resistor section 11 is short-circuited in FIG. 1a.

With respect to the structure of the saturable reactor 49, the conductor which lets the above commutating current flow therethrough is an input winding 51, which excites a iron core 53 having a rectangular hysteresis characteristic. The saturable reactor 49 is also provided with a reset winding 55, which is energized by DC power source through a resistor 57 in case of need.

An output winding 59 produces its output voltage across a resistor 63 through a diode 61. This output voltage is always maintained at a constant value by a voltage-regulator element, e.g. a Zener diode 65 or the like. Numerals 67 and 69 designate its output terminals.

FIG. 6 shows the respective performances with respect to the above means.

FIG. 6a shows the motor current, whose intensity before the time $t_1$ is equal to that of the current flowing through the resistor section 11 shown in FIG. 6b. When the contactor 11 is closed at the time $t_1$, the current flowing through the resistor section 11 is commutated into the circuit which comprises the contactor therein. (cf. FIG. 6c)

The winding 51 is excited by the above commutated current, magnetic flux level in the iron core 53 is transferred from one saturation value to the other one. A voltage is induced in the winding 59 due to this magnetic flux level variation, which appears across the resistor 63.

The voltage appearing across the resistor 63 is always maintained constant by the Zener diode 65, therefore, the voltage across the winding 59 has always a constant value $V_z$ independent of any value of the current flowing through the winding 51.

Accordingly, the iron core 53 is set at the other saturation value by the time integration of this voltage $V_z$. When the iron core 53 saturates, the voltage which has been induced in the winding 59 will vanish because of no variation in the magnetic flux level.

The output voltage such as shown in FIG. 6d is obtained across the terminals 67 and 69. The duration $T_L$ of the output voltage can arbitrarily be controlled if the Zener voltage $V_z$ of the Zener diode 65 is altered, therefore, it can be made equal to the time limit of the above time relay 43 through the selection of a suitable Zener voltage.

A means of preventing the ON, OFF signals from passing out of pulse-forming circuit 41 is easily provided. For instance, the ON, OFF signals can be supplied to the thyristor 23 or 25 in the switching circuit S through a pulse transformer from the pulse-forming circuit 41, then, a transistor can be inserted so as to short circuit the primary side of the pulse transformer and the output voltage of the saturable reactor is impressed on the base electrode of the transistor.

In another way, if the above output voltage is directly supplied to the differentiation circuit 47, a single OFF signal as described above can be obtained.

The magnetic flux level in the iron core 53 which has been set at a second saturation value is restored to a first saturation value by energizing the reset winding 55, thereby preparing for a next operation.

Figure 7:
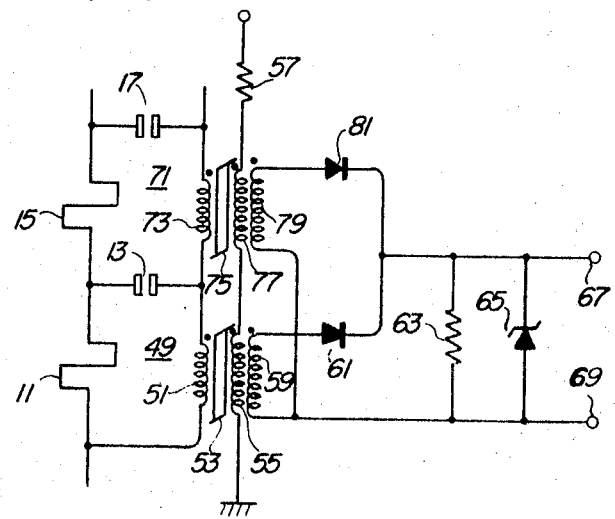

FIG. 7 shows circuit wherein the saturable reactor is used to short circuit a plurality of resistor sections. In this case, another saturable reactor 71, having an input winding 73, an iron core 75, a reset winding 77 and an output winding 79 is provided in the same manner as the saturable reactor 49, and another diode 81 is added to serve for this purpose.

The reset windings 55 and 77 in the two saturable reactors are connected in series and energized together by DC power source through the resistor 57.

Further, each end of the output windings 59 and 79 is commonly connected to one of the output terminals 69. Each other end of the output windings 59 and 79 is connected through the respective diodes 61 and 81 which are connected with each other and to the other one of the output terminals 67. A resistor 63 and a Zener diode 65 are connected across the terminals 67 and 69.

In case of control with more stages, more saturable reactors may be provided, each corresponding to the respective resistors sections, then the output windings thereof may also be connected in the same manner as those in FIG. 7.

In this arrangement shown in FIG. 7, an output such as shown in FIG. 6d can be obtained across the output terminals 67 and 69, each time the contactors 13 and 17 are closed.

In case of control employing many resistor sections, it is disadvantageous in view of work efficiency and cost to provide each resistor section with a respective iron core and to provide each iron core with a reset winding and also an output winding, respectively.

Figure 8:
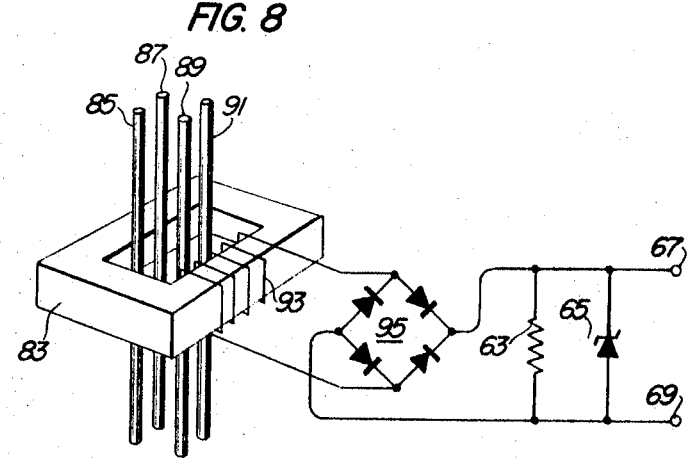

FIG. 8 shows a means which may be advantageously applied to a control system comprising many resistor sections as stated above. In FIG. 8, an annular iron core 83 having a rectangular hysteresis characteristic is provided, through which conductors 85, 87, 89 and 91 corresponding to the input windings shown in FIGS. 5 and 7 are passed.

Because the currents flowing through these conductors reach several hundred amperes, with respect to the input windings, a coil of one turn simply led through the iron core as shown in FIG. 8 can produce sufficient input flux.

Further, these conductors have to be so arranged that the currents commutated from the resistor sections by closing of the contactors may induce magnetic flux with alternately reversed polarities one after the other in the iron core.

That is to say, if the current direction in the conductor 85 is from top to bottom in FIG. 8, that in the conductor 87 should be from bottom to top; if that in the conductor 89 is again directed from top to bottom, that in the conductor 91 should be from bottom to top.

Further, a variation of the example shown in FIG. 8, the following example may be also utilized.

In FIG. 8, each of the conductors carrying a commutated current each time the contactors 13, 17, etc. are closed passes through the iron core. However, if all the conductors are bundled into two groups, every conductor in one group having the same current direction, further, each of the two groups of conductors is united to form two respective (lines of) conductors, and the currents flowing through these two conductors are made to produce magnetic flux in opposite directions to each other in an iron core 83, the construction of the iron core 83 may be simpler and smaller.

One output winding 93 is provided on the iron core 83, but in this case, the voltage induced in the winding 93 takes either a positive or negative value.

Therefore, it is necessary to rectify the induced voltage by means of a full-wave rectifier 95. A resistor 63 and a Zener diode 65 function in the same way as those in FIGS. 5 and 7.

In an experiment conducted by the inventors the number of resistor sections became as large as seven, therefore, the structure of the above variation of the embodiment shown in FIG. 8 was very effective.

In the meanwhile, with respect to the structure shown in FIG. 3, after a required time limit from the instant when an OFF signal is supplied to the switching circuit S, the duty cycle is again controlled from the value of $\gamma_{min}$.

The method wherein the ON and OFF signals are extinguished after an OFF signal is supplied to the switching circuit S aims at reducing the duty cycle of the switching circuit S to zero.

It is essentially impossible for the duty cycle of the switching circuit to be reduced to zero only by altering the time interval between ON and OFF signals, so even in the case of simultaneous impression of both ON and OFF signals, a short conductive state is inevitably left in the switching cycle.

Then, from a close observation of the operation of the switching circuit S shown in FIGS. 1a and 1b, it will be seen that the time at which the switching circuit S turns nonconductive as stated above coincides with the time subsequent to the impression of an ignition signal to the thyristor 25 by a half period of a series resonance caused by the capacitor 27 and the reactor 29.

This phenomenon, not being confined to the switching circuit having a structure such as shown in FIG. 1, may also be observed in a switching circuit having such a structure as to switch from a conductive state into a nonconductive state utilizing a resonance current caused by a combination of a capacitor and a reactor.

Consequently, it is impossible to reduce the duty cycle of the switching circuit S to zero by means of ON and OFF signals sent out from the pulse-forming circuit 41, further, even if ON and OFF signals are impressed at the same time, a conductive duration is still left, thereby causing the duty cycle to adopt a value corresponding to a half oscillation period as described above.

The duty cycle stated just above is substantially $\gamma_{min}$ of the switching circuit S.

Figure 4:
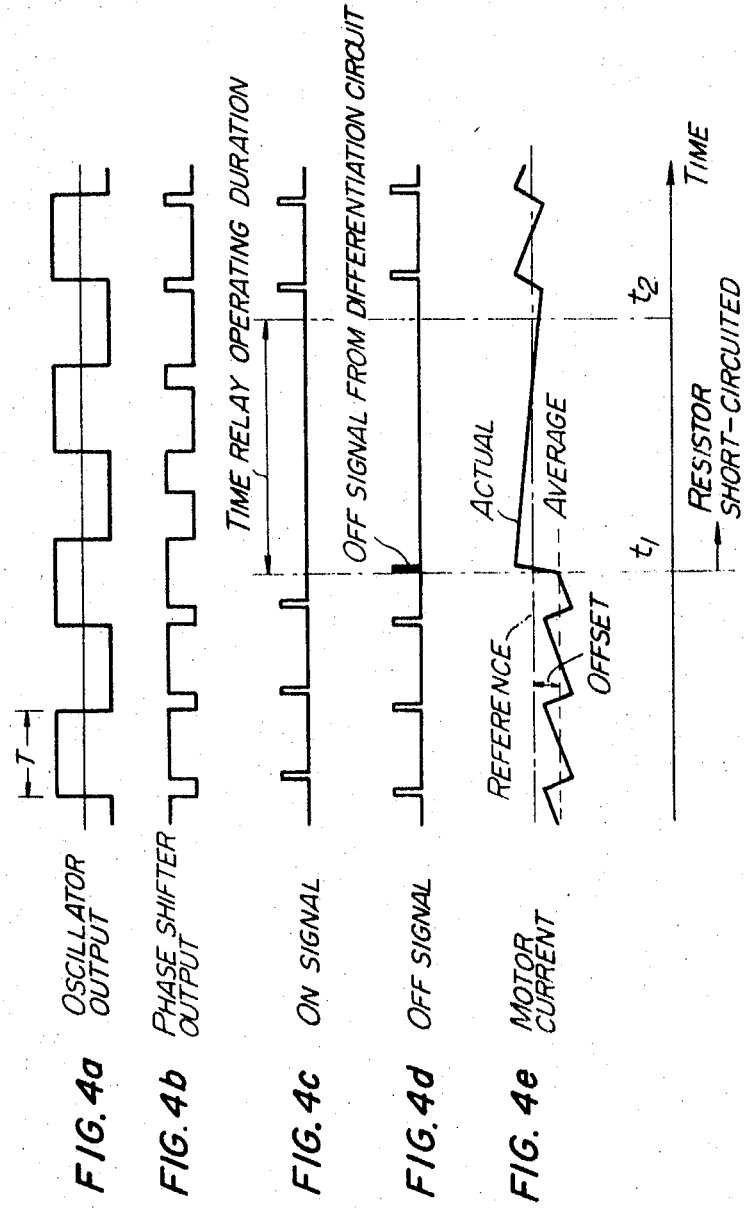
FIGS. 4a to 4e are performance charts illustrating performances of the above embodiment system.

If, at the time $t_2$ in FIG. 4, the time relay 43 is released to close the contacts 431 and 432, whereby ON and OFF signals are supplied to the switching circuit S from the pulse-forming circuit 41, the duty cycle of the switching circuit S varies suddenly from zero to $\gamma_{min}$.

In the case that $\gamma_{min}$ equals 0.1 as described already, it means a sudden variation in an equivalent resistance value of the resistor $R_0$ by 10 percent thereof. The influence of this sudden variation on the motor current becomes larger towards later notch stages.

The reason is that, in earlier notch stages, the main resistor R has a large resistance value, therefore, even if an equivalent resistance value of the resistor $R_0$ is varied by the extent of 10 percent thereof, it does not amount to a considerably large variation rate in relation to the total resistance value, but in later notch stages, the main resistor R has a small resistance value, therefore, a larger variation rate results in relation to the total resistance value.

FIG. 9 shows a principal portion of the structure of another embodiment according to the present invention through which system the above drawbacks due to the characteristic of the switching circuit S are removed. The other portions except that shown in FIG. 9 are all the same as those shown in FIG. 2.

Referring to FIG. 9, the phase shifter 37 shifts the phase of the output of the oscillator 39 corresponding to an output voltage $V_C$ of the comparator 33 in the same way as the phase shifter shown in FIG. 3.

A pulse-forming circuit 97 generates signals through the differentiation of only rising portions of the output waveform of the phase shifter 37. These signals are supplied to an OR circuit 99 through a normally closed contact 434 in the time-relay 43.

On the other hand, the output of the oscillator 39 is also shifted in its phase to a fixed degree by a fixed phase shifter 101.

This phase shift gives an arbitrary value of another duty cycle $\gamma'$ independent of the duty cycle $\gamma$ of the switching circuit S which is given by the phase shifter 37.

The output of the fixed phase shifter 101 is transformed into a pulse waveform through another pulse-forming circuit 103, one of which output pulses is supplied to the OR circuit 99 as an ON signal to the switching circuit S and the other one is supplied to the switching circuit S as an OFF signal thereof.

Referring to FIGS. 10a to 10c a description will be given of the performance of the above embodiment.

In the same manner as the embodiment system shown in FIG. 3, the phase shifter 37 shifts the phase of the rectangular wave output of the oscillator 39 as shown in FIG. 10a, which shifting mode is to be seen in FIG. 10b.

The phase shifter output as shown in FIG. 10b is differentiated at its rising portions through the pulse-forming circuit 97 resulting in the ON signal as shown in FIG. 10c.

On the other hand, the phase of the output of the oscillator 39 is shifted to a fixed degree by the fixed phase shifter 101. This phase-shifted output is differentiated through the pulse-forming circuit 103, resulting in an ON signal shown as black pulses in FIG. 10c and also an OFF signal as shown in FIG. 10d.

Consequently, the switching circuit S is always being supplied with ON and OFF signals which provide the duty cycle value $\gamma$. However, in a normal operation (cf. the operation before the time $t_1$ shown in FIG. 10), the ON signal coming from the phase shifter 37 is supplied to the switching circuit S earlier than that from the fixed phase shifter 101, hence, the ON signal supplied later has no influence on the performance of the switching circuit S.

At the time $t_1$, the time relay 43 operates and opens the contact 434 thereby stopping the ON signal coming from the phase shifter 37.

Accordingly, ON and OFF signals are simultaneously supplied to the switching circuit S from the fixed phase shifter 101, hence, the duty cycle of the switching circuit S is immediately converted to $\gamma'$. Then, the above duty cycle is maintained at $\gamma'$ through the operating duration of the time relay 43.

Here, if $\gamma'$ is predetermined to be equal to $\gamma_{min}$ described before, at the same time when the resistor section 11 is short-circuited, a resistance represented by $R_0(1-\gamma_{min})$ is inserted into the main circuit.

If the resistance values of the resistor sections are so chosen as to satisfy the relation $R_1 > (\gamma_{max}-\gamma_{min})R_0$, the total resistance value just before short-circuiting the resistor section 11

$$R_1 + _2 + R_3 + R_0(1-\gamma_{max}) \qquad (8)$$

becomes larger than the total resistance value after short-circuiting the resistor section 11

$$R_2 + _3 + R_0(1-\gamma) \qquad (9)$$

hence, the motor current is increased as is shown in FIG. 10e thereby producing negative deviation $\epsilon$.

A phase shifter caused by the phase shifter 37 is reset to the phase shift corresponding to $\Delta_{min}$ by means of the above negative deviation in the operating duration of the time relay 43.

In consequence, after the time $t_2$ when the time relay 43 is released, the duty cycle of the switching circuit S is continuously controlled starting from $\gamma_{min}$.

As described above, in this embodiment, ON and OFF signals are always supplied to the switching circuit S in a way such as to give $\gamma_{min}$, while, in each notch stage, the motor current is controlled by supplying a second ON signal corresponding to the deviation $\epsilon$ of the actual current value from the reference current value which is preceding the first ON signal, and, in transition, the said second ON signal is stopped thereby immediately restoring the duty cycle of the switching circuit S to $\gamma_{min}$.

For this reason, there occurs no sudden variation in resistance value due to a sudden variation in the duty cycle $\gamma$ after transition is entered.

Then, comparing the first embodiment with the second one, it will be seen that the first embodiment provides a means for controlling the switching circuit S before transition is entered, while the second embodiment provides a means for controlling the switching circuit S after transition is entered.

In the second embodiment, the switching circuit S does not turn nonconductive immediately after short-circuiting a resistor section. Hence, if the time $t_1$ shown in FIG. 10 occurs soon after the arrival of any one ON signal shown in FIG. 10c a time interval between the arrival of one ON signal and the arrival of the next OFF signal is nearly equal to one operating period T of the switching circuit S.

During the above time interval, the resistance value of the resistors connected in series with the motor M becomes $$R_2+_3 \quad (10)$$

whereby the motor current is increased quite suddenly and overshoot will be brought about over one or two operating periods of the switching circuit S.

Since the operating period T of the switching circuit S is generally chosen within a range of 20—30 msec., the overshoot is limited to a very short duration, then it will offer no practical problem.

However, if a more perfect control is to be required, the following embodiment combining the above first and second embodiments will serve that purpose.

FIG. 11 shows the desirable third embodiment. Each element is similar to that shown in FIGS. 3 and 9. Now, referring to FIGS. 12a to 12e, the performance of this third embodiment will be explained.

Until just before short-circuiting the resistor section 11 (i.e. before the time $t_1$ in FIG. 12), the switching circuit S is in operation with its duty cycle at $\gamma_{max}$.

At the time $t_1$ when the contactor 13 is closed and the resistor section 11 is short-circuited, a time relay 43 operates to close a contact 433 and to open a contact 434.

Consequently, a differentiation circuit 47 is supplied with DC voltage from DC power source, therefore, a signal obtained by differentiating the DC voltage is supplied as an OFF signal to the switching circuit S through an OR circuit 45.

At the same time, the ON signal coming from a pulse-forming circuit 97 is stopped by the contact 434.

However, ON and OFF signals corresponding to $\gamma_{min}$ which is determined by a fixed phase shifter 101 are supplied to the switching circuit S from a pulse-forming circuit 103 through an OR circuit 99 and the OR circuit 45 respectively.

Accordingly, when the resistor section 11 is short-circuited, the switching circuit S is immediately turned nonconductive, and ON and OFF signals are supplied to the switching circuit S making the duty cycle have a value of $\gamma_{min}$ within one period of the normal operation of the switching circuit S.

For this reason, even if the resistor section 11 is short-circuited immediately after the ON signal is supplied to the switching circuit S, no occasion arises wherein both resistance values across the resistor section 11 and the resistor $R_0$ respectively are simultaneously made zero, then, as is shown in FIG. 12e, an increase in the motor current is prevented.

If the relations among the resistance values are so chosen as in the first embodiment, a phase shift in the phase shifter 37 may be reset at a minimum value because of the deviation $\epsilon$ coming to a negative value, as is shown in FIG. 12b.

After that, from the time $t_2$ when the time relay 43 is released to close the contact 434, the switching circuit S is held under a continuous control started from $\gamma_{min}$.

According to this embodiment, both at the beginning and end of transition, no overshoot is produced in the motor current thereby assuring a better operation of the motor M.

In the second and third embodiments, such means employing saturable reactors as shown in FIGS. 5 to 8 may also be utilized instead of the time relay 43 interlinked with the contactors.

All descriptions of the above three embodiments have been related to transitions under normal driving conditions.

If a reduction in the motor current occurs due to a variation in contact wire voltage, slip, etc. in the transition duration, the motor current does not exceed the reference value, whereby it maintains a continuous positive deviation $\epsilon$, despite the fact that the relations among resistance values predetermined respectively in the above systems are satisfied.

Since a phase shift in the phase shifter 37 is to be restored due to zero or a negative deviation $\epsilon$, if a positive deviation $\epsilon$ is produced in the transition duration, the phase shifter 37 will not be completely reset even after the termination of transition.

Therefore, when the next notch stage control is started after the termination of transition, the duty cycle of the switching circuit S is abruptly changed into a duty cycle $\gamma$ of some magnitude, from zero in the first embodiment, or from $\gamma_{min}$ in the third embodiment.

These sudden variations in the duty cycle are undesirable, as has already been described.

FIG. 13 shows a means for providing a control system which has been improved in this respect.

FIG. 13 shows a wiring diagram for the comparator 33 shown in FIG. 2. The output of the means shown in FIG. 13 is supplied as a control voltage $V_C$ to the phase shifter 37, and the structure to be employed after the phase shifter 37 may be either of those in the above first and third embodiments.

In FIG. 13, a voltage proportional to the reference value is supplied across terminals 105 and 107, then that voltage $V_p$ appears across a resistor 109. A current detector 111 is inserted into a suitable place in the main circuit shown in FIG. 1 where the motor current is to be detected conveniently. The output of the current detector 111 produces a voltage $V_m$ proportional to the motor current across a resistor 113. The above two voltages $V_p$ and $V_m$ are counterbalanced in a control winding 121 of a magnetic amplifier 117 through an adjusting resistor 115, thereby impressing a voltage proportional to the difference between $V_p$ and $V_m$ onto the control winding 121.

The magnetic amplifier 117 is of a general type, provided with iron cores 119 having a rectangular hysteresis characteristic on which the control winding 121 and two output windings 123 and 125 are wound and serves for amplifying a control input supplied to the control winding 121 by means of AC source voltage impressed across terminals 131 and 133. Diodes 127, 129, 135 and 137 are provided for supplying a rectified output.

With respect to the output of the magnetic amplifier 117, the output voltage proportional to the difference between the above two voltages $V_p-V_m$ appears across a load 139.

Then, this voltage appears across terminals 145 and 147 as an output voltage $V_c$ of the comparator 33 which increases with time according to a time constant determined by a resistor 141 and a capacitor 143. This time constant is provided for a required stability in the above control system.

The normally open contact 435 in the time relay 43 which is interlinked with the contactor for short-circuiting the corresponding resistor section is connected across the capacitor 143.

Next, performances of the above system will be described referring to FIGS. 14a to 14c.

If the reference value is given at the time $t_0$ in FIG. 14, a voltage corresponding to the deviation $\epsilon$ of the actual motor current value detected by the current detector 111 from the given reference value appears across the resistor 139, and a gradually increasing voltage $V_c$ shown in FIG. 14a is generated across the terminals 145 and 148.

The phase shifter 37 is controlled by the above voltage, and, as is shown in FIG. 14b, the phase shift is gradually increased from a minimum value.

In consequence, as is shown FIG. 14c, the duty cycle of the switching circuit S is also increased gradually and reaches $\gamma_{max}$ at the time $t_1$.

According to the arrival of the duty cycle at $\gamma_{max}$, the contactor is closed by another control means thereby short-circuiting the resistor section.

In consequence of the operation of the contactor, the time relay 43 interlinked therewith is also operated to close the contact 435 thereby short-circuiting the capacitor 143.

Accordingly, the voltage across the capacitor 143 falls rapidly as is shown in FIG. 14a, hence the output voltage $V_c$ of the comparator 33 namely the input to the phase shifter 37 is finally reduced to zero, therefore, the phase shifter 37 begins to reset from the time $t_1$.

On the other hand, as is shown in FIG. 14c, the duty cycle of the switching circuit S is made $\gamma_{min}$ at once simultaneously with closing of the contactor by means of the previously described embodiments. It has already been described that overshooting is produced in the motor current if there exists a time delay in this operation.

The phase shift in the phase shifter 37 which started to be reset from the time $t_1$ is reduced to a minimum value at the time $t_2$.

Therefore, the duty cycle of the switching circuit S has to be maintained at $\gamma_{min}$ between the time $t_1$ and the time $t_2$ namely during the time required for the phase shifter 37 to be reset at the above minimum value.

Even if, in the interval, the motor current should be reduced because of source drop and its deviation $\epsilon$ from the reference value should then be increased towards a positive value, because the output side of the comparator 33 is being short-circuited by the contact 345, the input to the phase shifter 37 is maintained at zero, thereby the phase shifter 37 is completely reset.

At the time $t_2$ when the time relay 43 is released to open the contact 435, the control voltage to the phase shifter 37 namely the voltage $V_c$ across the terminals 145 and 147 rises gradually from zero according to the time constant determined by the resistor 141 and the capacitor 143, and correspondingly, the phase shift increases.

Thus, the duty cycle of the switching circuit S is sure to be controlled from $\gamma_{min}$.

The above description has been mainly given of an example of power running of an electric motor under a source voltage variation, however, it will be apparently applicable to the case wherein, as in case of an electric rolling stock, the motor current is reduced because of a slip condition of the motor.

Now, the functional effect according to the present invention will be confirmed by the results of the experiments conducted by the inventors.

The main circuit employed in the experiments has a structure of dynamic braking shown in FIG. 1b.

Seven resistor sections are to be short-circuited by contactors. To detect short-circuiting of each resistor section there is employed a saturable reactor, which has already been described as a variation of the embodiment shown in FIG. 8. The control circuit employed is that shown in FIG. 11 as a third embodiment, wherein a brake pattern to provide a brake current is employed as the reference value for the motor current.

FIGS. 15a to 15e show oscillagrams indicating the results of the above experiment.

With respect to each of FIGS. 15a to 15e, FIG. 15a shows the brake pattern, FIG. 15b shows the motor current namely the brake current, FIG. 15c shows the input to the phase shifter, and $\gamma_{min}$ and $\gamma_{max}$ shown in FIG. 15c indicate the input levels to the phase shifter where the duty cycles of the switching circuit S become $\gamma_{min}$ and $\gamma_{max}$ respectively. FIG. 15d shows the output of the saturable reactors which detect short-circuiting of the resistor sections. The last FIG. 15e shows the motor speed which is being converted to the velocity of an electric rolling stock.

When a braking instruction is given, a brake pattern to provide a motor current is produced as is shown in FIG. 15a, whereby the control is started.

If the motor current rises up as is shown in FIG. 15b, the motor is braked and the generated voltage therein goes down.

If the motor current is reduced as the generated voltage goes down thereby increasing its deviation $\epsilon$ from the reference current value, a phase shift in the phase shifter is increased to increase the motor current. The phase shift increases gradually then through a repetition of the above processes as is shown in FIG. 15c.

If the phase shift reaches a value which corresponds to $\gamma_{max}$, it is detected and then one resistor section is short-circuited. Short-circuiting of the resistor sections is detected as respective outputs of the saturable reactors as shown in FIG. 15d.

In this instance, a slight variation is observed in the motor current, however, it offers no problem because its very small value and also of its very short duration.

The velocity of the electric rolling stock is reduced gradually, as is shown in FIG. 15e, through a repetition of the operations described above.

What we claim is:

1. A control system for electric motors comprising:
    first means connected to an electric motor for changing the electric motor current in a plurality of successive control stages of operation in a step-by-step manner;
    second means connected to said first means for converting the current change of the electric motor by said first means to a substantially linear variation over a prescribed range for each control stage of operation by variation of the impedance thereof;
    control means for controlling the impedance of said second means within said prescribed range, including signal means of said second means within said prescribed range, including signal means for supplying alternately to said second means;
    a first signal for reducing the impedance of said second means to a relatively low impedance state and a second signal for increasing the impedance of said second means to a relatively high impedance state, means for varying the interval between said first and second signals to correspond to the deviation of the actual motor current value from a reference current value and actuating means for actuating said first means to effect a transition into the next control stage of operation when the interval between said first and said second signals reaches a predetermined value;
    auxiliary control means responsive to said actuating means for controlling the impedance of said second means during transition of said first means from one control stage to the next control stage, including interrupting means for interrupting said first signal being supplied to said second means from said control means and impedance control means for switching the impedance of said second means to said relatively high impedance state during the duration of said transition.

2. A control system for electric motors according to claim 1, wherein said first means includes a plurality of impedance sections connected in series, and contactor means connected to respective impedance sections for selectively short-circuiting said sections.

3. A control system for electric motors according to claim 2, wherein said second means includes a switching circuit whose operation is controlled by said control means to effect an alternation between the conductive state and the nonconductive state thereof and an additional impedance section connected in series with said plurality of impedance sections and connected in parallel with said switching circuit.

4. A control system for electric motors according to claim 3, wherein said switching circuit comprises:
    a first thyristor connected across said additional impedance section in the direction of flow of said motor current therethrough;
    and commutating means for commutating the current flow through said first thyristor including a second thyristor connected in parallel to said first thyristor, a diode connected between the anodes of said first and second thyristors, and resonance means connected in parallel to said second thyristor in the form of an inductive element and a capacitive element.

5. A control system for electric motors according to claim 3, wherein said control means which controls said switching means comprises:
   an oscillator generating a rectangular wave voltage,
   a phase shifter which shifts the phase of said rectangular wave voltage generated by said oscillator in response to a signal representing the deviation of the actual motor current value from the reference current value applied to the input thereof;
   and a first pulse forming circuit which differentiates the rising and falling portions, respectively, of the phase shifted rectangular wave to form said first and said second signals.

6. A control system for electric motors according to claim 5, wherein said input to said phase shifter is short circuited during the duration of said transition.

7. A control system for electric motors according to claim 3, wherein impedance control means in said auxiliary control means including auxiliary means for applying to said switching circuit a third signal for increasing the impedance of said second means to said relatively high impedance state as soon as the transition is entered, and wherein said interrupting means serves to simultaneously interrupt said first and said second signals supplied by said control means during the duration of said transition.

8. A control system for electric motors according to claim 7, wherein said auxiliary means includes a differentiation circuit, said interrupting means being formed by a relay selectively connecting said differentiating circuit to a DC voltage source so as to selectively generate said third signal upon actuation of said interrupting means.

9. A control system for electric motors according to claim 3, wherein said impedance control means in said auxiliary control means includes auxiliary means for alternately supplying to said switching circuit third and fourth signals spaced to maintain the impedance of said second means at said relatively low impedance state during the duration of said transition.

10. A control system for electric motors according to claim 9, wherein said auxiliary means comprises:
    an oscillator generating a rectangular wave voltage,
    a fixed phase shifter for shifting the phase of said rectangular wave voltage generated by said oscillator to a predetermined degree;
    and a second pulse forming circuit which differentiates the phase shifted rectangular wave to form said third and said fourth signals.

11. A control system for electric motors according to claim 3, wherein said impedance control means in said auxiliary control means includes auxiliary means for applying to said switching circuit a third signal for increasing the impedance of said second means to said relatively high impedance state as soon as the transition is entered, and alternately to said switching circuit fourth and fifth signals spaced to maintain the impedance of said second means at said relatively low impedance state during the duration of the transition.

12. A control system for electric motors according to claim 2, wherein each of said contactor means comprises a saturable reactor, said saturable reactors being coupled to said impedance sections so as to detect the closing of the contactor of the respective contactor means, the output of each saturable reactors being employed to actuate said auxiliary control means at the time of entrance into transition.

13. A control system for electric motors according to claim 12, wherein all of said saturable reactors are formed on a common iron core, the currents from said impedance sections due to closing of said contactor means serving to induce magnetic flux with alternately reversed polarities successively in said iron core.

UNITED STATES PATENT OFFICE
CERTIFICATE OF CORRECTION

Patent No. 3,581,172　　　　　　　　Dated May 25, 1971

Inventor(s) Takashi Tsuboi, et al

It is certified that error appears in the above-identified patent and that said Letters Patent are hereby corrected as shown below:

First page of patent, priority data ([32]) should read:

--April 1, 1968, and April 17, 1968--

Signed and sealed this 22nd day of May 1973.

(SEAL)
Attest;

EDWARD M. FLETCHER, JR.　　　　　　ROBERT GOTTSCHALK
Attesting Officer　　　　　　　　　Commissioner of Patents